United States Patent [19]

Benson et al.

[11] Patent Number: 4,590,472

[45] Date of Patent: May 20, 1986

[54] ANALOG SIGNAL CONDITIONER FOR THERMAL COUPLED SIGNALS

[75] Inventors: Michael R. Benson; William D. Hill, both of San Jose, Calif.

[73] Assignee: General Electric Company, San Jose, Calif.

[21] Appl. No.: 446,004

[22] Filed: Dec. 1, 1982

[51] Int. Cl.⁴ .................. G08C 19/22; G08C 15/06
[52] U.S. Cl. .................. 340/870.04; 340/870.17; 340/514; 374/133
[58] Field of Search .............. 340/870.04, 870.17, 340/514; 374/133, 197, 128; 376/247

[56] References Cited

U.S. PATENT DOCUMENTS

| | | | |
|---|---|---|---|
| 2,449,072 | 9/1948 | Houghton | 340/870.04 |
| 3,582,926 | 6/1971 | Hassan | 340/514 |
| 3,750,155 | 7/1973 | Oman | 340/870.04 |
| 3,777,568 | 12/1973 | Risgin | 374/133 |
| 4,005,273 | 1/1977 | Siems | 340/870.04 |
| 4,483,631 | 11/1984 | Kydd | 340/870.17 |

Primary Examiner—James J. Groody
Attorney, Agent, or Firm—Ivor J. James, Jr.; Samuel E. Turner; Raymond G. Simkins

[57] ABSTRACT

The present invention described a signal conditioner. A thermocouple produces a signal that is present at a summing node input of a conditioning amplifier. The conditioning amplifier has a plurality of selectable gain values by which amplifier sensitivity may be varied to complement that of the thermocouple. Provision is made at the summing node input of the summing amplifier for thermocouple cold junction compensation and range offset. The present invention finds application in monitoring thermal conditions in an industrial process, such as a nuclear reactor. The high degree of precision and reliability required in such processes is maintained by including a test circuit which provides a selectable test pulse to the summing node input of the conditioning amplifier. One aspect of the present invention is the provision for testing during actual circuit operation in a process and irrespective of selected conditioning amplifier sensitivity. An additional aspect of the present invention is the inclusion of a summing node wherein various characteristics of conditioning amplifier contour may be independently adjusted without degradation or interference of one characteristic with the other.

6 Claims, 5 Drawing Figures

ANALOG SIGNAL CONDITIONER FOR THERMAL COUPLED SIGNALS

BACKGROUND OF THE INVENTION

1. Field of the Invention

The present invention relates to instrumentation in an environment requiring accurate and continuous extraction of test data during operation of the instrumentation device and of the system in which the device is operating. More particularly, the present invention provides a fully testable analog signal conditioner for thermocouple signals from which process parameters are derived from such industrial processes as the generation of electric power by nuclear energy.

2. Description of the Prior Art

Analog trip devices are relatively well known in the instrumentation art. Modularization of such devices is also known. For example, in the nuclear power plant environment, Rosemont Corporation manufacturers a line of analog trip modules designated analog control units.

Bailey Meter Company has previously built signal conditioning printed circuit boards using a bridge type circuit for all signal conditioning and offset adjustments. All adjustments in the bridge type of circuit are interactive with each other. The Bailey signaling condition circuitry is not testable while installed and during normal circuit operation.

One analog trip device that is capable of being tested at any time during normal system operation is described in U.S. patent application Ser. No. 402,371, filed July 27, 1982, now abandoned, entitled APPARATUS AND METHOD FOR GENERATING TRIP SIGNALS. The described analog trip module generally operates in a signal range of 1–5 volts. Such level, while effective for trip module operation, is excessive for signal conditioning applications.

Thermocouples provide a signal in the range of from 2–120 mV (millivolts). Existing self-testing techniques are not applicable to the sensitive analog signal conditioning equipment needed with the low level signals provided by thermocouples.

The modular approach to instrumentation signal conditioning equipment necessitates the use of a common circuit for different thermocouple signal levels. The prior art, where self-testing has been available, does not offer a means for testing signal conditioning equipment operating at various signal sensitivity levels. Indeed, most such signal conditioners are not even adjustable to operate at different levels of sensitivity. Furthermore, the bridge-type configuration of prior art signal conditioners does not allow for simple substitution of thermocouple types. Changing a thermocouple type to accommodate different measurement parameters at various process locations, unbalances the bridge. In practice, a new bridge circuit must be supplied for each different thermocouple type to be used with the signal conditioner and for each sensitivity setting.

Finally, the bridge approach of the prior art signal conditioners does not allow for independent adjustment of other parameters, such as signal offset. The interaction between the various adjustments in prior art signal conditioners, due to the limitations of bridge-type level detection, necessitates the commitment of considerable time to signal conditioner alignment and calibration by trained maintenance personnel. Such adjustments, in addition to being difficult to make, tend to lower the reliability of the signal conditioner. This problem is particularly pronounced in equipment operating at low signal levels, such as those at which the signal conditioner operates, some of which are on the order of a few millivolts.

There has heretofore been no signal conditioning equipment for process instrumentation applications that is testable in situ during system operation, modular so that it may be readily used with different thermocouples and at different, selectable gain levels, and that provides a plurality of selectable, independent signal parameters for shaping circuit response characteristics.

SUMMARY OF THE INVENTION

The present invention is a fully on line testable analog signal conditioner for thermocouple signals. The normal range of the signal is 2–120 mV (millivolts), full scale. The signals are derived process parameters, such as containment building temperature etc. in a nuclear reactor electrical generation process. The present invention provides delicate front end signal conditioning circuitry including a series of selectable sensitivity ranges. Range selection does not affect testability of the signal conditioning circuitry. Additionally, a summing node is provided wherein a cold junction compensation reference signal may be summed with a thermocouple input signal and also with an offset signal. The summing node eliminates interaction between the various signals presented to the signal conditioner. Adjustment of each signal is independent one from the other.

A thermocouple is provided to the summing node input of a conditioning amplifier. The conditioning amplifier includes a plurality of selectable gain values, allowing conditioning amplifier sensitivities 2–200 mV.

Thermocouples typically require cold junction compensation adjustment. The present invention includes a cold junction compensation adjustment reference signal that is presented to the summing node input of the conditioning amplifier. The inclusion of the cold reference adjustment ensures circuit precision in varying environmental conditions.

Also present at the summing node input of the conditioning amplifier is an offset signal. Offset signal range is selectable by positioning a jumper between various terminals. The offset signal provides a fixed bias level for center scale measurements, as well as for specified signal range responsive circuitry.

The output of the conditioning ampifier is coupled to a variable gain output amplifier or buffer which, in turn, provides an analog output signal indicative of process conditions as sensed by the thermocouple. A calibration circuit is included in the output amplifier circuitry whereby the characteristic gain of the output amplifier may be precisely set with a selected calibration current.

The present invention is intended for incorporation into a process monitoring system that includes a brief test interval during actual system operation. In the exemplary embodiment of the invention, one of two modes of tests may be performed during a testing interval (which is of a short duration, insufficient to interfere with actual system operation). During the testing sequence, a selected reference signal is applied to the summing node input of the conditioning amplifier. Sensitivity of the conditioning amplifier is also adjusted so that amplifier range is within that of the test signal, irrespective of the selected conditioning amplifier sensitivity.

DETAILED DESCRIPTION OF A PREFERRED EMBODIMENT

Figure 1:
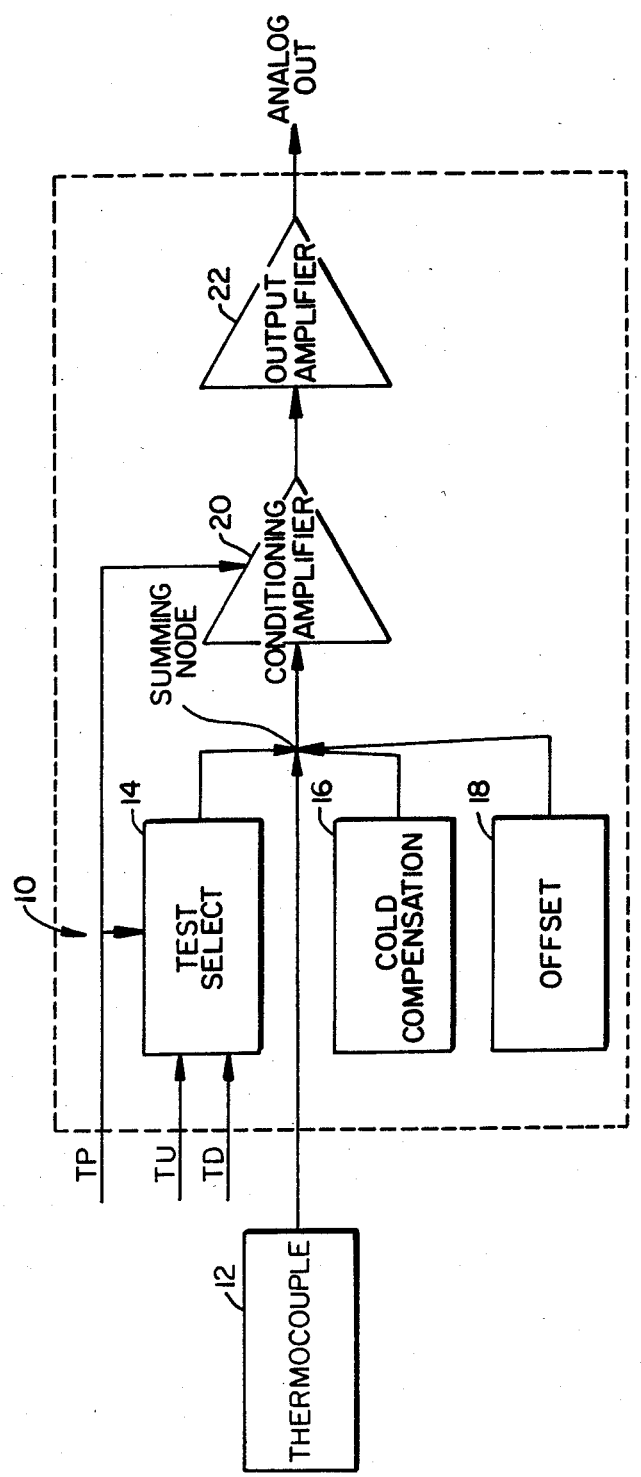
FIG. 1 is a block diagram of an exemplary embodiment of the present invention.

The present invention, an analog signal conditioner for thermocouple signals, finds application in industrial process monitoring for such processes as nuclear reactor electrical generation. Signal conditioner 10 (FIG. 1) has as an input a signal provided by a thermocouple 12. The thermocouple is typically located at or near a monitored process, such as a containment building in a nuclear reactor electrical generation system. Thermocouple devices of this type are well known in the art and are readily available from many commercial sources.

Thermocouple 12 produces a low level electrical signal on the order of 2-120 mV (millivolts). This signal is routed to a summing node input of a conditioning amplifier 20. The conditioning amplifier produces an output signal that is coupled to an output amplifier 22 which, in turn, produces an analog output signal corresponding to monitored process thermal conditions.

The signal conditioner is typically located on a printed circuit board at a location remote from the thermocouple. Environmental conditions at the signal conditioner location may vary. Additionally, thermocouple operation may produce an output signal over a varied range. The ambient temperature at the remote signal conditioner location may be used to provide a reference temperature against which thermocouple output signals may be compared. Due to variations in the ambient about the signal conditioner, compensation is also included for fluctuation in temperature at the reference location. To this end a cold junction compensation circuit 16 is included by which a varying offset signal is added at the summing node input of conditioning amplifier 20.

It is also desirable to add an offset voltage to the thermocouple output signal such that dynamic range of measurement is increased and also such that a center zero measurement may be obtained. To accomplish this, an offset circuit 18 is provided, which circuit produces a selectable offset voltage. The offset voltage is coupled to the summing node input of the conditioning amplifier.

It can be seen in FIG. 1 that the circuit of the present invention is built around the summing node conditioning amplifier input. That is, the thermocouple signal, cold compensation signal, and offset signal, are all joined at the conditioning amplifier summing node input. This arrangement allows various adjustments to be made to the characteristics of the analog signal produced by the signal conditioner. These adjustments are all independent one from the other such that adding an offset does not require additional cold compensation, nor does it effect the contour of the signal produced by the thermocouple. It should be noted that although cold compensation and offset signals are shown present at the summing node, they could be eliminated or additional compensating signals can be added as desired.

An important feature of the invention is test select circuit 14. A test line TP is shown connected to test select circuit 14 and conditioning amplifier 20. The present invention allows for testing of signal conditioner circuit integrity in situ and during active signal conditioner operation. To accomplish this, a test pulse of short duration (on the order of 1 millisecond) is sent throughout the entire system of which the signal conditioner is a part. Locally, the incidence of the test pulse is as indicated in FIG. 1. The test pulse accomplishes two objects in the present invention: the conditioning amplifier is set to an established gain level, irrespective of the selected amplifier gain or sensitivity; and test select circuit 14 is actuated to inject a test signal into the signal conditioning circuitry through the summing node input of the conditioning amplifier.

The test signal, once injected into the signal conditioner, is then monitored at output of output amplifier 22. In this way signal conditioner integrity and operation are assured without the need of removing the circuit from the process it is monitoring. Referring to the Fig., it should be noted that test signal injected may be an upper level signal (TU) or a lower level signal (TD). The present invention provides for testing not only of signal continuity and circuit integrity, but also of circuit response to the presence of signals of differing levels.

Figure 2:
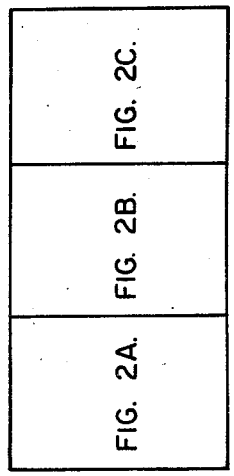
FIG. 2 is an outline sketch showing the relationships of FIGS. 2A-2C.
Figure 2A:
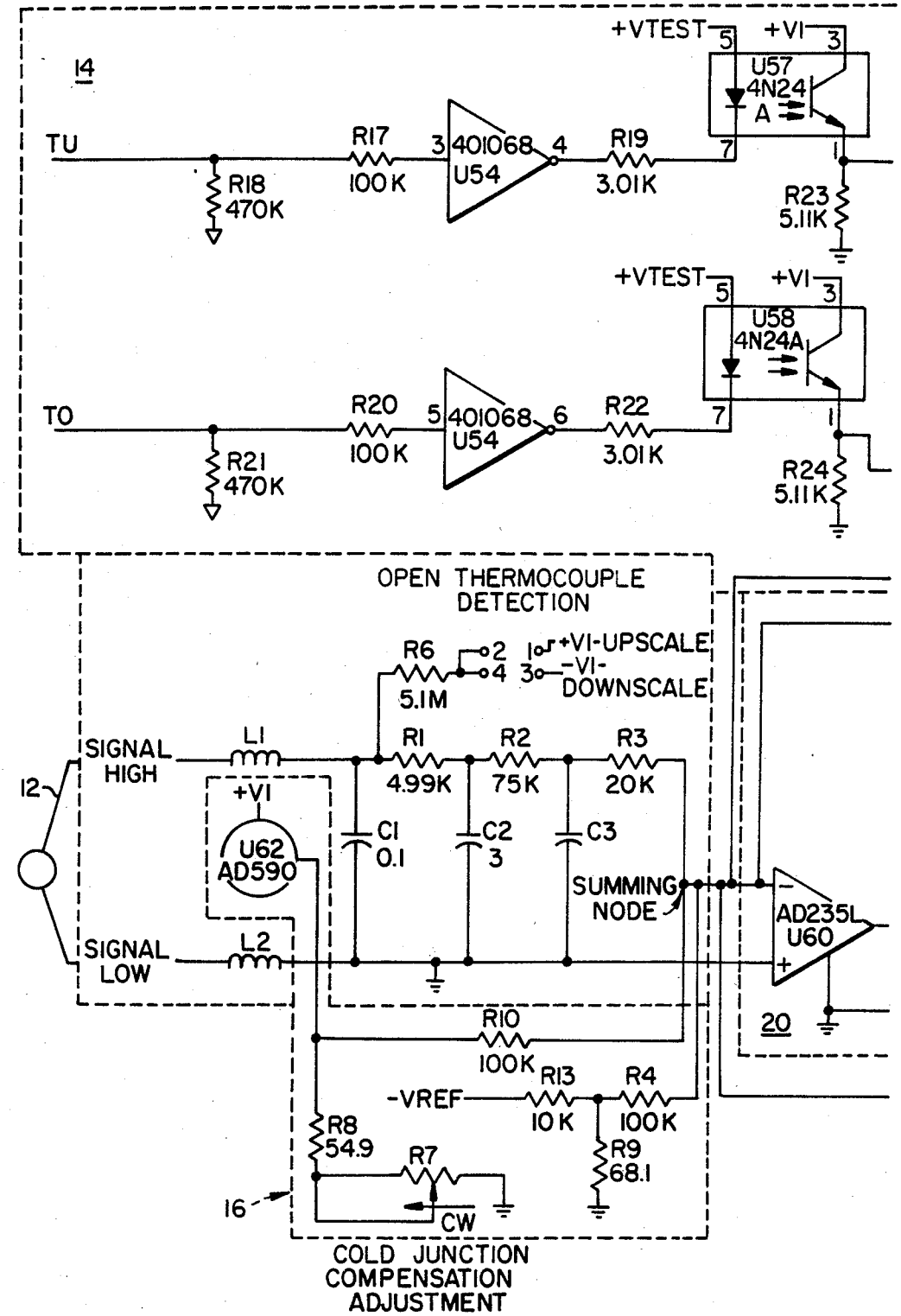
FIGS. 2A-2C are schematic diagrams of an exemplary embodiment of the present invention.
Figure 2B:
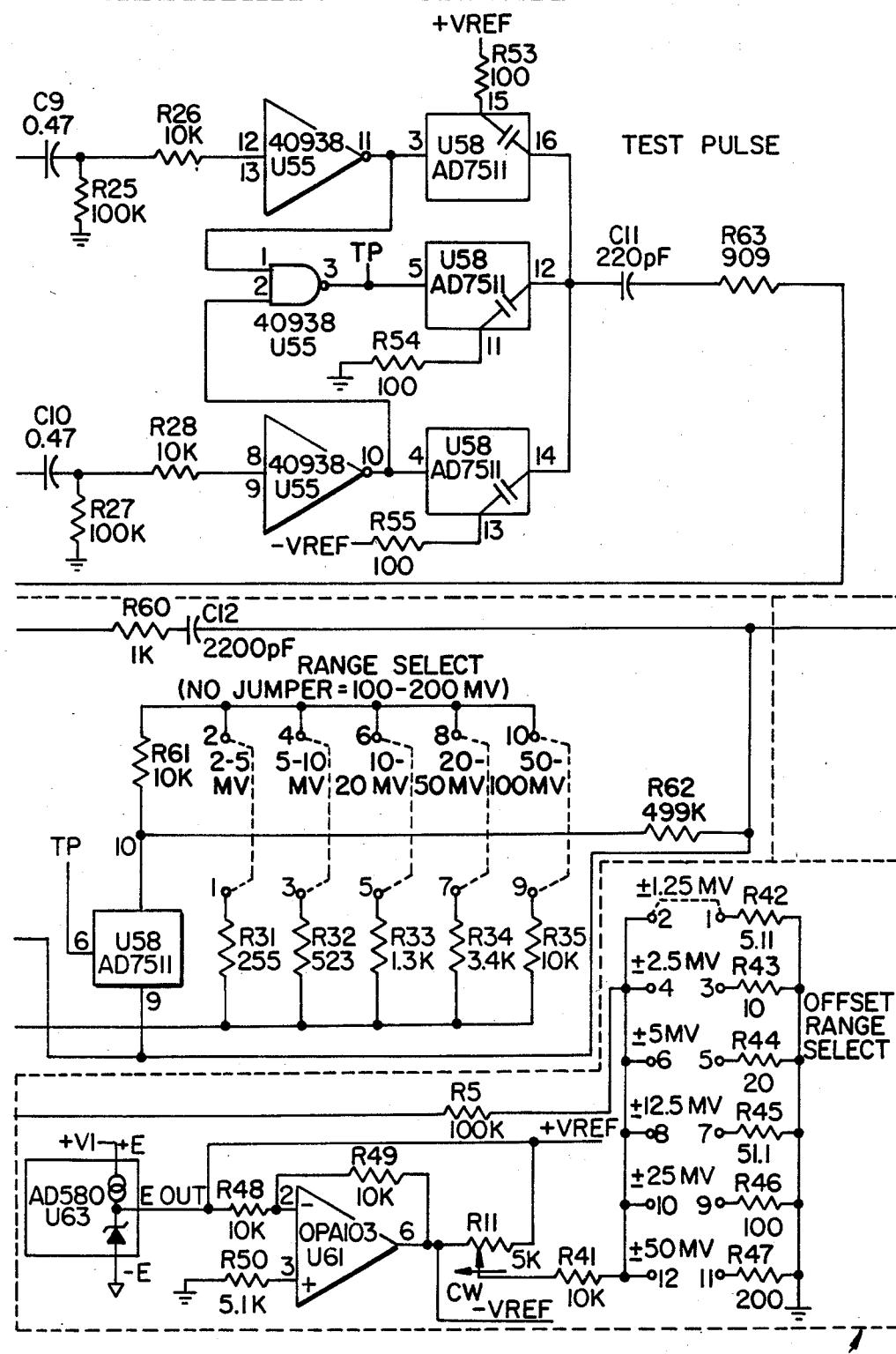
Figure 2C:
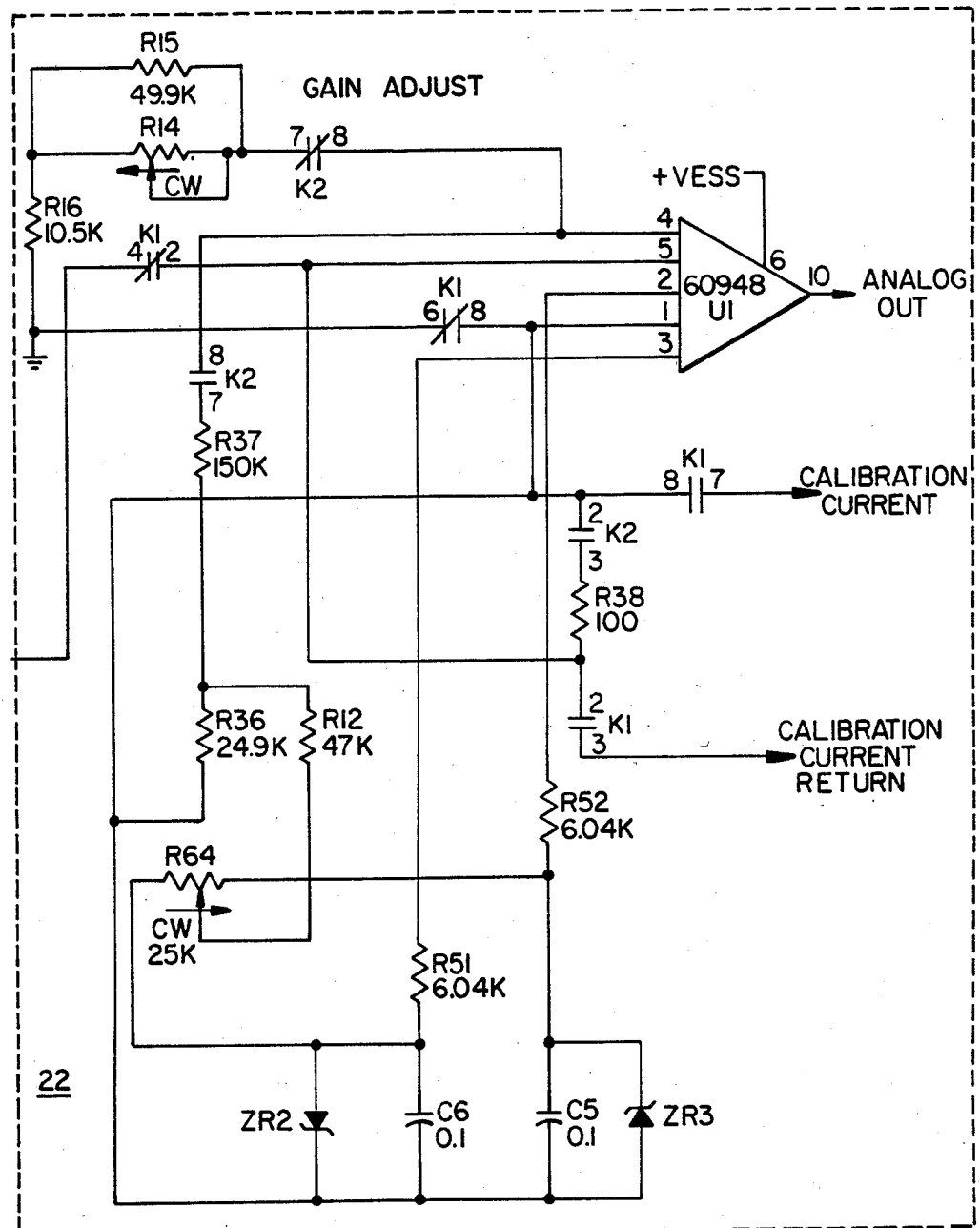

Referring now to FIG. 2, a schematic diagram of an exemplary embodiment of the invention is shown. A thermocouple 12 output signal is routed to signal conditioner circuit 10 at SIGNAL HIGH and SIGNAL LOW input terminals. The thermocouple signal is routed through inductors L1 and L2, respectively. An input filter is formed by inductors L1 and L2, resistors R1-R3, and capacitors C1-C3. The SIGNAL LOW output of the thermocouple is coupled through inductor L2 to the non-inverting input of a conditioning amplifier U60. The filtered SIGNAL HIGH output of the thermocouple is connected to the inverting input of amplifier U60. It is the inverting input of amplifier U60 that forms the summing node.

Occasionally a thermocouple fails. It is important to report this condition immediately and, to that end, an open thermocouple detection circuit, comprising a resistor R6 and a jumper selectable connection between a positive or a negative voltage source, is provided. By jumping across terminals 1 and 2 of the open thermocouple detection circuit with a shorting wire, an upscale reading (pinning the needle of an indicator meter) indicates an open thermocouple; when the jumper is placed between pins 3 and 4, a downscale reading (no meter needle movement) indicates an open thermocouple.

Cold junction compensation is provided, as discussed above. A cold reference U62 senses the ambient temperature at the signal conditioner. Cold reference U62 is a temperature dependent current source, connected to a positive voltage source; it provides a varying current to a current divider comprised of resistors R8 and R10 and potentiometer R7. Adjustment of potentiometer R7 varies the amount of cold junction compensation and thus varies the slope of temperature indication as sensed by the thermocouple.

To add range to the cold junction compensation adjustment circuitry a negative reference voltage is supplied through a resistor network consisting of resistors R4, R9, and R13, to the summing node input of conditioning amplifier U60. The variable cold junction compensation signal supplied through resistor R10 is thereby balanced so that a net zero value is summed at the summing node when no compensation is required, and so that a positive or negative value may be summed at the node to accordingly compensate for temperature variation.

Voltage offset circuit 18 includes a voltage reference device U63 coupled through a resistor R48 to an operational amplifier U61. An amplifier reference level is established by a resistor R50; an amplifier gain value is established by a feedback resistor R49. The voltage reference output from amplifier U61 is adjusted by a potentiometer R11 and is coupled through a resistor R41 to an offset range select circuit comprised of resistors R42-R47. By connecting a jumper between the various pins (for example pins 1 and 2) an offset voltage is coupled through a resistor R5 to the summing node input of the conditioning amplifier. In the example of a jumper between pins 1 and 2 of the offset range select, resistor R42 provides a voltage drop for the reference voltage such that an offset of ±1.25 mV is added to the signals present at the summing node. Potentiometer R11 is included as an offset range fine adjustment.

Signal conditioning amplifier U60 is a chopper stabilized amplifier. A feedback path from the output of amplifier U60 includes a filter circuit consisting of a resistor R60 and a capacitor C12. The output of the amplifier is coupled through relay K1 contacts K1-2/4 to output amplifier U1. Operation of relay K1 and amplifier U1 is discussed below.

Amplifier U60 gain or sensitivity is determined by jumper selectable resistors R31-R35. By placing a jumper between appropriate terminals (for example, 1 and 2), a desired conditioning amplifier sensitivity may be obtained. The gain select path is completed by resistors R61/R62. Selection of sensitivity by jumping appropriate resistors produces a selectable sensitivity range of 2-5 mV, 5-10 mV, 10-20 mV, 20-50 mV, or 50-100 mV. The absence of a jumper results in a sensitivity range of 100-200 mV.

During normal operation, the signals summed at the summing node of conditioner amplifier U60 are routed through the relay contacts as described above and to the input of output amplifier U1. In this way, an analog output signal is produced, which signal is indicative of thermal conditions at a monitored process location and as sensed by the thermocouple.

Output amplifier U1 features a variable gain adjust circuit including resistors R15/R16 and potentiometer R14, and may be calibrated in place by providing a calibration current as shown in the Fig. During amplifier U1 calibration relay K1 is energized, thereby opening relay contacts K1-2/4 and K1-6/8. This disconnects the conditioning amplifier from the output amplifier and connects the calibration current, through relay contacts K1-7/8 to amplifier U1. The calibration current is returned to its source (not shown) through relay contacts K1-2/3.

In the calibration mode, a second relay K2 is also energized. As a result, potentiometer R64 and associated resistors R12, R36-R38, R51, and R52 receive the calibration current. The output amplifier is calibrated by adjustment of R64. Zener diodes ZR2/ZR3 and associated capacitors C5/C6 are included for circuit protection.

To test the signal conditioner while it is installed within a system and in operation, without interfering with its normal operation, a short duration test pulse (on the order of 1 millisecond) is provided to solid state switches U58-5 (test select circuitry) and U58-6 (conditioning amplifier gain select). The test pulse closes switch U58-6, thereby shorting out resistor R62 and conditioning amplifier U60 to have a known and established sensitivity or gain value.

The test pulse also closes switch U58-5, thereby coupling a resistor R54 between ground and a test circuit output node. Any test signal produced by the test circuit is dropped across resistor R54; a test circuit output signal is thereby routed through a filter, consisting of a capacitor C11 and a resistor R63, to the summing node input of amplifier U60.

The test select circuit may couple either a positive reference voltage (+V REF) or a negative reference voltage (−V REF) to the summing node of amplifier U60 for testing purposes. In this way, an upscale or a downscale test may be performed and circuit response may be tested, as well as circuit integrity and continuity.

To select an upscale test, an upscale test select signal (TU) is coupled through a resistor network R17/R18, an inverter U54-4, and a resistor R19 to an optoisolator U57. An optoisolator is used to prevent transients in the test pulse or a false test pulse from triggering a test sequence. The optoisolator is also included to isolate essential test circuitry, such as the signal conditioning circuit, from other system circuitry (not shown).

The upscale test signal actuates optoisolator U57, which produces a voltage drop across a resistor R23. The pulse thereby produced is coupled through a filter capacitor C9 and a resistor network R25/R26 to an input of a Schmidt trigger U55-11. The Schmidt trigger produces a very sharp, fast test pulse that is coupled to solid state switch U58-3. When the signal conditioner is placed in a test sequence, actuation of switch U58-3 routes a positive reference voltage through a resistor R53 to the summing node input of amplifier U60.

A downscale test pulse (TD) is coupled through a resistor network consisting of resistors R20/R21, an inverter U54-6, and a resistor R22 to optoisolator U59. When actuated, the optoisolator drops a voltage across a resistor R24. The pulse thereby produced is routed through filter capacitor C10 and a resistor network consisting of resistors R27/R28 to Schmidt trigger U55-10. The pulse produced by the Schmidt trigger actuates a solid state switch U58-4 which, in turn, connects a negative reference voltage through a resistor R55 to the summing input of amplifier U60.

To ensure that a negative and a positive test pulse are not presented at the summing node at the same time, the output of a NAND gate U55-3 is coupled to solid state switch U58-5. In the event that both the TU and the TD signal are present simultaneously, the NAND gate produces a signal disabling operation of switch U58-5 and thus aborting the test sequence, as it relates to the signal conditioner circuit.

It can be seen from the foregoing that the present invention provides a conditioning amplifier having an extremely sensitive front end and that is amenable to testing during actual in situ circuit operation. The amplitude of the test pulse may be constant for all different selectable signal conditioner sensitivities. Additionally, a summing node is included that allows different thermocouples to be used and also allows the inclusion of an offset and other such adjustments. All signals present at the summing node operate independently of the others. The characteristic response contour of the thermal conditioner may be set for any desired application or thermocouple type. This versatility, coupled with the reliability inherent in a circuit that is testable from end to end as is the present invention, allows for the production of a modular component that may be used for many different applications.

The exemplary embodiment of the invention, as set out in the figures and as discussed above, is subject to various changes and may be made in different embodiments without departing from the scope and spirit of the claimed invention. For example, the part values indicated on the schematic could be varied for different applications, as could the particular active devices specified. Additionally the calibration current circuit could be modified or altogether eliminated, among other such modifications. Therefore, the scope of the invention should be limited only by the breadth of the claims.

We claim:

1. In a device for monitoring thermal conditions at selected locations in a nuclear power generation facility, an analog signal conditioner for low-level thermocouple generated signals, including a conditioning amplifier having a summing node input terminal for receiving said thermocouple signals and for producing an analog output signal corresponding thereto, contour means coupled to said summing node input terminal for shaping characteristic response of said amplifier to said thermocouple signals, and a signal conditioner test circuit, comprising:
    first switch means, coupled to said conditioning amplifier, for setting conditioning amplifier sensitivity to a preselected level in response to a short duration test pulse; and
    second switch means, coupled to said conditioning amplifier summing node input terminal, for supplying a test signal to said conditioning amplifier in response to said test pulse.

2. The test circuit of claim 1, further comprising:
    third switch means, coupled to said conditioning amplifier summing node input terminal, for selecting test signal level in response to a test level command.

3. The test circuit of claim 2, said third switch means further comprising:
    a first level select path for receiving a first level test command; and
    a second level select path for receiving a second level test command.

4. The test circuit of claim 3, wherein each test signal level select path further comprises means for isolating said test level command from said analog signal conditioner.

5. The test circuit of claim 4, further comprising:
    means for detecting the presence of more than one test level command and for disabling said test circuit in response thereto.

6. In a device for monitoring thermal conditions at selected locations in an industrial facility, an anlog signal conditioner for low-level thermocouple generated signals, comprising:
    a conditioning amplifier having a summing node input terminal for receiving said thermocouple signals, said amplifier producing an analog output signal corresponding thereto;
    contour means, coupled to said summing node input terminal, for shaping characteristic response of said amplifier to said thermocouple signal;
    means for injecting a test signal into said summing node input terminal during a selected test interval for signal conditioner testing;
    means for selecting test signal level; and
    means for setting said conditioning amplifier have a sensitivity characteristic corresponding to test signal level.

* * * * *